United States Patent
Newell (10) Patent No.: US 7,123,511 B2
(45) Date of Patent: Oct. 17, 2006

(54) SYSTEMS AND METHODS FOR WRITE PROTECTION OF NON-VOLATILE MEMORY DEVICES

(75) Inventor: Russell D. Newell, Greenville, TX (US)

(73) Assignee: L-3 Integrated Systems Company, Greenville, TX (US)

(*) Notice: Subject to any disclaimer, the term of this patent is extended or adjusted under 35 U.S.C. 154(b) by 0 days.

(21) Appl. No.: 11/438,587

(22) Filed: May 22, 2006

(65) Prior Publication Data

US 2006/0209595 A1    Sep. 21, 2006

Related U.S. Application Data

(62) Division of application No. 10/849,485, filed on May 19, 2004, now Pat. No. 7,072,211.

(51) Int. Cl.
*G11C 16/04*    (2006.01)
(52) U.S. Cl. .............................. 365/185.04; 365/185.05
(58) Field of Classification Search ........... 365/185.04, 365/185.01, 189.01
See application file for complete search history.

(56) References Cited

U.S. PATENT DOCUMENTS

| | | | | |
|---|---|---|---|---|
| 5,226,006 A | * | 7/1993 | Wang et al. | 365/189.01 |
| 5,668,760 A | * | 9/1997 | Hazen | 365/189.01 |
| 5,877,975 A | | 3/1999 | Jigour et al. | |
| 6,175,517 B1 | | 1/2001 | Jigour et al. | |
| 6,331,950 B1 | * | 12/2001 | Kuo et al. | 365/185.18 |
| 6,739,515 B1 | * | 5/2004 | Wallace | 235/492 |
| 2002/0169022 A1 | | 11/2002 | Canterbury | |
| 2003/0093606 A1 | | 5/2003 | Mambakkam et al. | |
| 2003/0099147 A1 | | 5/2003 | Deng et al. | |

OTHER PUBLICATIONS

Xilinx, "System ACE CompactFlash Solution", DS080 (v1.5), Apr. 5, 2002, pp. 1-69.
Xilinx, "System ACE MPM Solution", DS087 (V2.2), Jun. 13, 2003, pp. 1-34.
Linux, "RE: Modding IDE Cable To Write-Protect Compact Flash", http://linux.derkeiler.com/Newsgroups/comp.os.linux.embedded/2003-08/0258.html, Aug. 2003, 2 pgs.
Linux, "Modding IDE Cable To Write-Protect Compact Flash", http://216.239.41.104/search?q=cache:pfkYeDvC2TsJ:linux.derkeiler.com/Newsgroups/comp.os.linux.embedded/2003-08/0255.html, Aug. 2003, 2 pgs.
"256MB Ridata Compact Flash Card 40X Write 52X Read Professional", My Digital Discount, http://www.mydigitaldiscount.com/product_info.php?products_id=53, Dec. 22, 2003, 3 pgs.
"PDA/Camera Memory", Memory Product Specifications, The Memory Place, https://www.buymemory.com/memory/ModelModuleDetail.asp?Package=DigitalFilm, (obtained from Internet Dec. 2003), 4 pgs.
SimpleTech, "SimpleTech Announces ProX Series of Secure Digital Flash Memory Cards ProX SD Cards Are Eight Times Faster Than Standard Secure Digital Flash Cards", http://www.coporate-ir.net/ireye/ir_site.zhtml?ticker=STEC&script=410&layout=0&item_id=468101, Nov. 10, 2003, 2 pgs.

(Continued)

*Primary Examiner*—Anh Phung
(74) *Attorney, Agent, or Firm*—O'Keefe, Egan & Peterman, LLP (57) ABSTRACT

A write protection mechanism may be implemented that is external to a non-volatile memory device and/or that is external to controller/s that interface with the non-volatile memory device, thus providing increased security over unauthorized and/or undesirable write cycles to the memory device. Write protection security may be further enhanced by providing a write protection control signal that is external to the non-volatile memory and attached memory controller/s, thus preventing accidental or intentional override.

23 Claims, 5 Drawing Sheets

OTHER PUBLICATIONS

"RE: [leaf-user] LEAF On Compact Flash", Oct. 30, 2003, 2 pgs.
"RE: [leaf-user] LEAF On Compact Flash", Oct. 31, 2003, 3 pgs.
"RE: [leaf-user] LEAF On Compact Flash", Nov. 8, 2003, 3 pgs.
Xilinx, "System ACE MPM Solution", DS087 (v1.0), Sep. 25, 2001, pp. 1-29.
Search Report, PCT/US05/17407; 9 pgs.

* cited by examiner

SYSTEMS AND METHODS FOR WRITE PROTECTION OF NON-VOLATILE MEMORY DEVICES

This application is a divisional of co-pending U.S. Ser. No. 10/849,485, entitled "Systems And Methods For Write Protection Of Non-Volatile Memory Devices" filed on May 19, 2004, now U.S. Pat. No. 7,072,211, issued on Jul. 4, 2006, and which is incorporated herein by reference in its entirety.

BACKGROUND OF THE INVENTION

1. Field of the Invention

This invention relates generally to non-volatile memory, and more particularly to write protection for non-volatile memory devices, such as Compact flash ("CF").

2. Description of the Related Art

In many computing environments, it is desirable to prevent unwanted write accesses to memory. In secure computing environments it is often desirable to prevent unauthorized recording of data into memory. In non-secure environments, it is often desirable to prevent accidental deletion or overwriting of data stored in memory.

SUMMARY OF THE INVENTION

Disclosed herein are systems and methods for write protection of non-volatile memory, such as compact flash memory devices. Using the disclosed systems and methods, a write protection mechanism may be implemented that is external to a non-volatile memory device (e.g., removable compact flash device) and/or that is external to controller/s that interface with the non-volatile memory device, thus providing increased security over unauthorized and/or undesirable write cycles to the memory device. To further increase security against unauthorized write cycles, the disclosed systems and methods may be further implemented to provide write protection in response to a signal that is external to the non-volatile memory and attached memory controller/s, thus preventing accidental or intentional override. Although the disclosed systems and methods may be implemented to provide write protection in a variety of different storage environments (e.g., to prevent accidental deletion or overwriting of currently-stored data), particular advantage may be realized in secure computing environments, where the ability to ensure prevention of unauthorized recording of data into non-volatile memory is a primary concern.

Because the disclosed systems and methods may be implemented to provide a write protection mechanism that is external to the non-volatile memory device, additional security may be advantageously achieved in secure environments when relatively small removable memory devices are employed. Such an external write protection mechanism may be configured in one embodiment so that it is not accessible by a user/s of the non-volatile memory device, e.g., so that secure data may not be written to a removable non-volatile memory device without permission and the memory device then removed from the secure environment. In this regard, the external write protection mechanism may be implemented, for example, so that only the custodian of a secure lab has access to the write protection mechanism of the disclosed systems and methods. However, in other embodiments, a write protection mechanism may be implemented in a manner that is at least partially internal or integral to a non-volatile memory device and/or controller/s coupled to interface with the non-volatile memory device.

To provide additional flexibility, the external write protection mechanism of the disclosed systems and methods may be selectably enabled in one embodiment to prevent writing of a given type of data to a non-volatile memory at certain times, but to allow the given data to be written to a removable non-volatile memory device at other times. This selectable enablement feature may be advantageously employed, for example, to allow a given system to be operated in both secure and non-secure modes. Additional security may be provided in one exemplary embodiment by selectably implementing the external write protection mechanism using an external write protection control signal (e.g., via external hardware switch or jumper), thus eliminating the possibility that write protection may be defeated by programming. However, in other embodiments an external write protection control signal may be selectably provided using a software or firmware-based switching feature if so desired.

Advantageously, the disclosed systems and methods may be further implemented in one embodiment to selectably block particular types of write cycles to a non-volatile memory device, such as specific programming write cycles, while allowing other types of cycles to occur (e.g., non-programming write cycles, control register write cycle, status register read cycles, etc.). Such a selectable write cycle implementation allows specific write cycles to a non-volatile memory device to be blocked at the same time allowing other types of accesses to the non-volatile memory device. In this regard, particular types of write cycles may be identified by monitoring bus cycles provided by a microprocessor that initiates a given write cycle. However, in another embodiment, the disclosed systems and methods may be implemented to block all write access, or to block both read and write access, to a non-volatile memory device if so desired.

In one respect, disclosed herein is a non-volatile memory system, including: a non-volatile memory device; a first controller coupled to the non-volatile memory device, the first controller configured to provide data for writing to the non-volatile memory device; and write protection circuitry coupled to the first controller and the non-volatile memory device, the write protection circuitry being configured to monitor at least one signal provided by the first controller, and to selectably disable the data from being written to the non-volatile memory device based at least in part on the monitored signal. The write protection circuitry may be configured external to the non-volatile memory device and the first controller. The write protection circuitry may also be configured to be selectably disabled in response to a write protection control signal to allow all data provided by the first controller to be written to the non-volatile memory device.

In another respect, disclosed herein is a non-volatile memory system, including: a non-volatile memory device; a first controller coupled to the non-volatile memory device, the first controller configured to provide data for writing to the non-volatile memory device; write protection circuitry coupled to the first controller and the non-volatile memory device, the write protection circuitry being configured to monitor at least one signal provided by the first controller, and to selectably disable the data from being written to the non-volatile memory device based at least in part on the monitored signal; and a second controller coupled between the non-volatile memory device and the first controller, the second controller being configured to receive the data from the first controller and to provide the data for writing to the non-volatile memory device. The write protection circuitry may be configured external to the non-volatile memory device and the first controller.

In another respect, disclosed herein is a memory system, including: a removable compact flash memory device; a first controller coupled to the non-volatile memory device; a second controller coupled between the non-volatile memory device and the first controller; and write protection circuitry coupled to the first and second controllers. The write protection circuitry may be configured external to the non-volatile memory device and the first and second controllers. The first controller may be configured to provide at least a first address signal, a first data signal, a first chip enable signal and a first write enable signal to the second controller. The second controller may be configured to provide at least a second address signal, a second data signal and a second chip enable signal to the non-volatile memory device. The second controller may be coupled to the write protection circuitry and may be further configured to provide a second write enable signal to the write protection circuitry. The write protection circuitry may be configured to monitor at least the first address signal, the first data signal, the first chip enable signal and the first write enable signal. The write protection circuitry may be further configured to provide a third write enable signal to the non-volatile memory device to enable data to be written to the non-volatile memory device. The write protection circuitry may be further configured to selectably disable the data from being written to the non-volatile memory device by withholding the third write enable signal from the non-volatile memory device based at least in part on the monitored address, data, chip enable and write enable signals provided by the first controller.

In another respect, disclosed herein is a method of providing write protection for a non-volatile memory device coupled to a first controller, including: providing data for writing to the non-volatile memory device from the first controller to the non-volatile memory device; externally monitoring at least one signal provided by the first controller; providing write protection for the non-volatile memory by selectably disabling the data from being written to the non-volatile memory device based at least in part on the externally monitored signal; and selectably disabling the write protection in response to a write protection control signal by allowing all data provided by the first controller to be written to the non-volatile memory device.

In another respect, disclosed herein is a method of providing write protection for a non-volatile memory device coupled to first and second controllers, including: providing data for writing to the non-volatile memory device from the first controller to the second controller; providing the data for writing to the non-volatile memory device from the second controller to the non-volatile memory device; externally monitoring at least one signal provided by the first controller; and providing write protection for the non-volatile memory by selectably disabling the data from being written to the non-volatile memory device from the second controller based at least in part on the externally monitored signal.

DESCRIPTION OF ILLUSTRATIVE EMBODIMENTS

Figure 1:
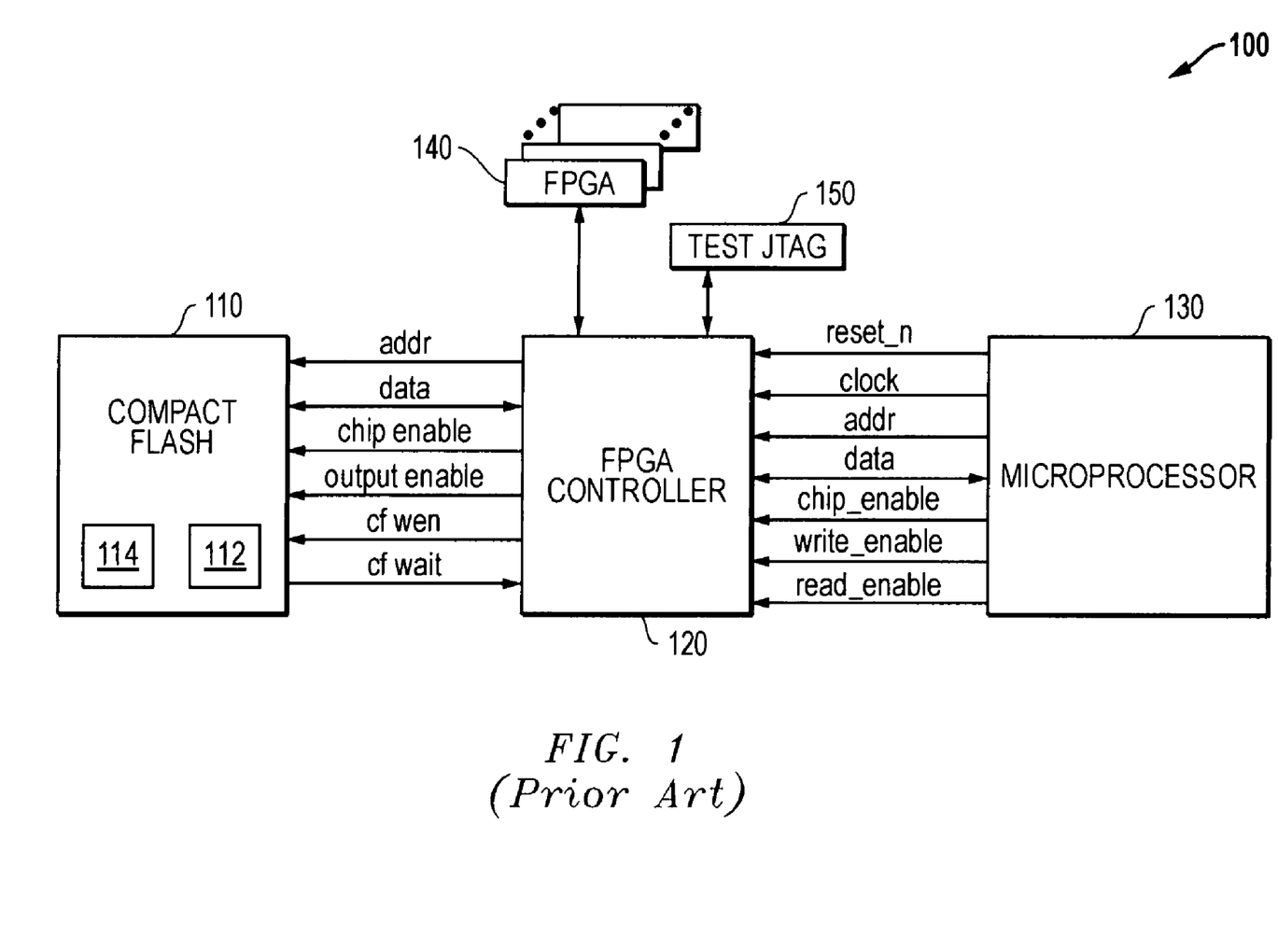
FIG. 1 illustrates a multiple FPGA configuration and control system according to the prior art.

FIG. 1 illustrates a prior art multiple Field Programmable Gate Array (FPGA) configuration and control system 100 that includes a FPGA controller 120 that is coupled between multiple FPGA devices 140, microprocessor 130, Compact flash device 110 and Test JTAG interface 150. As shown, Compact flash device 110 includes an internal or on-card controller 112 coupled to non-volatile memory 114 for managing interface protocols, data storage and retrieval, defect handling, error correcting code, power management and clock control. Compact flash device 110 functions as storage for configuration data and other system data. In the illustrated configuration, FPGA controller 120 manages FPGA configuration data and provides an interface between multiple FPGA devices 140 and multiple configuration sources that include microprocessor 130, Compact flash device 110 and Test JTAG (Joint Test Action Group) interface 150. As illustrated, the FPGA configuration and control system 100 of FIG. 1 includes no write protection mechanism that is external to the illustrated components of system 100 that may be used to prevent unwanted write accesses to the write/readable media of Compact flash device 110.

Figure 2:
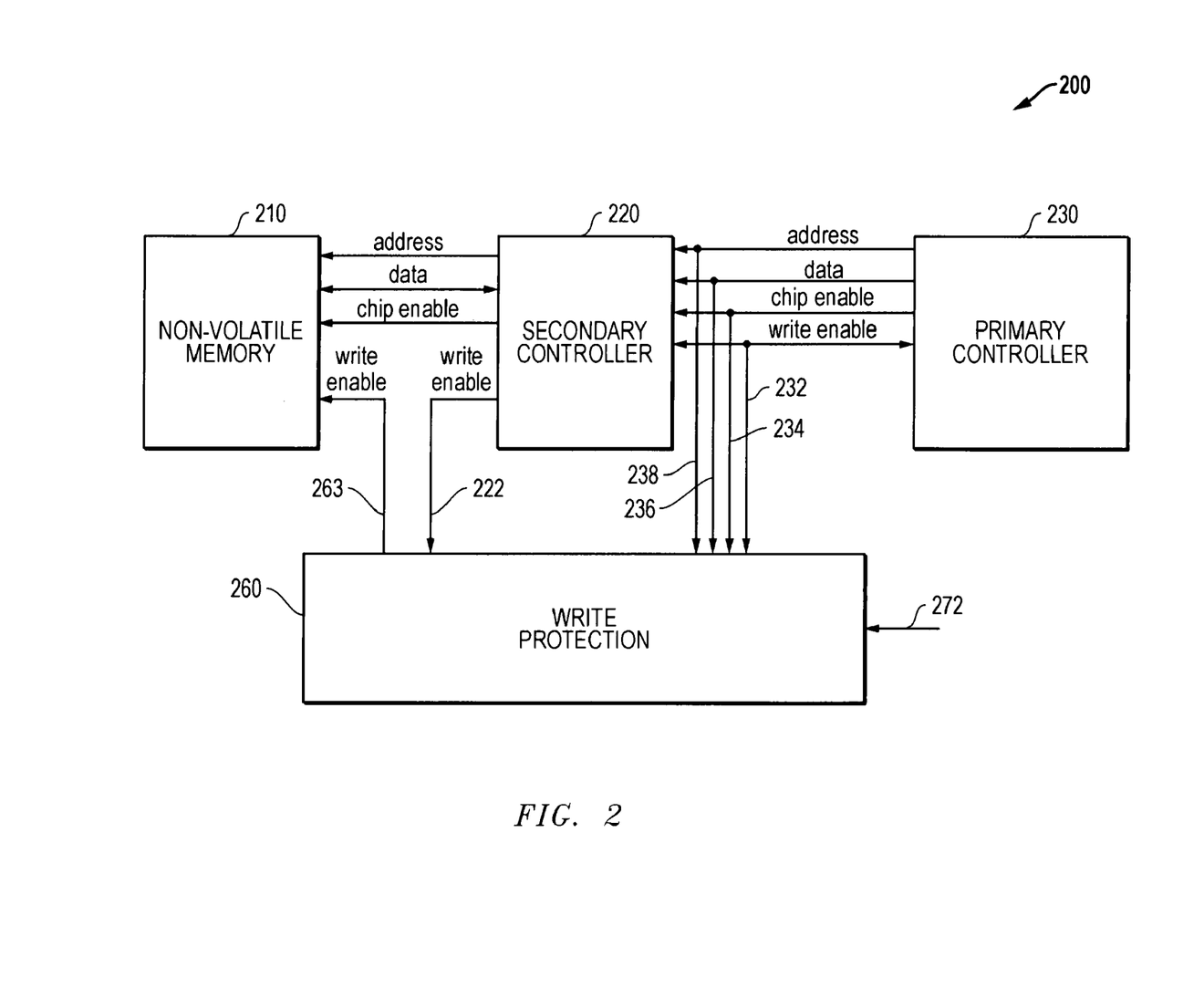
FIG. 2 illustrates a non-volatile memory system configured with write protection circuitry according to one embodiment of the disclosed systems and methods.

FIG. 2 illustrates a non-volatile system 200 according to one exemplary embodiment of the disclosed systems and methods. As illustrated in FIG. 2, system 200 includes a secondary controller 220 that is coupled between primary controller 230 and non-volatile memory device 210. Non-volatile memory device may be any type of suitable non-volatile memory including a removable non-volatile memory device or a non-removable non-volatile memory device. Specific examples of suitable non-volatile memory devices include, but are not limited to, CompactFlash devices, MicroDrive Storage Devices, SmartMedia cards, MultiMedia cards, Secure Digital cards, etc.

FIG. 2 shows write protection circuitry 260 that is coupled between primary controller 230 and non-volatile memory device 210 in the manner shown. As so configured, write protection circuitry 260 is configured to monitor write cycles received from primary controller 230 and to control write access to non-volatile memory device 210. As illustrated, an optional write protection control signal 272 may be provided to write protection circuitry 260 to selectably enable and disable write access to non-volatile memory device 210. It will be understood that it is not necessary that write protection circuitry 260 be capable of selective enablement, i.e., when it is desired that write protection be permanently enabled.

Primary controller 230 may be any microprocessor, microcontroller or other processing device suitable for providing data to be written to one or more addresses within non-volatile memory device 210. In the illustrated exemplary embodiment, primary controller 230 is shown configured to provide address, data, chip enable and write enable signals to secondary controller 220. It will be understood that the illustrated embodiment is exemplary only, and that additional, fewer and/or other types of signals may be provided by a primary controller to a secondary controller, and/or to non-volatile memory, in other embodiments of the disclosed systems and methods.

Secondary controller 220 may be any microprocessor, microcontroller or other device suitable for receiving data from primary controller 230, and for providing this data to be written to one or more addresses within non-volatile memory device 210. In the illustrated exemplary embodiment, primary controller 230 is shown configured to provide address, data and chip enable signals to non-volatile memory device 210. Secondary controller 220 is also shown configured to provide a write enable signal 222 to write protection circuitry 260.

In the illustrated embodiment, non-volatile memory device 210 is shown configured to receive address, data and chip enable signals from secondary controller 220. Non-volatile memory device 210 is also configured to receive write enable signal 263 from write protection circuitry 260.

Write protection circuitry 260 may be configured to detect and disallow specific types of write cycles (e.g., programming write cycles, etc.) based on at least one monitored signal provided by primary controller 230 that may be, for example, indicative of the type of data to be written by the write cycle. In this regard, write protection circuitry 260 may be configured to monitor one or more device access signals (e.g., address, data, chip enable, write enable signals, etc.) provided by primary controller 230. For example, in the of the exemplary embodiment of FIG. 2, write protection circuitry 260 is shown configured to monitor address, data, chip enable, and write enable signals provided by primary controller 230 to secondary controller 220, as illustrated by respective monitor signals 238, 236, 234 and 232.

Still referring to the exemplary embodiment of FIG. 2, write protection circuitry may be configured to selectably block one or more signals between secondary controller 220 and non-volatile memory device 210 that are required to enable a write cycle. For example, in the illustrated embodiment, write protection circuitry 260 is coupled to receive a write enable signal 222 corresponding to a given write cycle from secondary controller 220, and to allow the given write signal by providing a corresponding write enable signal 263 for the given write cycle, or to disallow the given write signal by withholding the corresponding write enable signal 263 for the given write cycle.

In one exemplary embodiment, the specific type of write cycles that may be searched for by write protection circuitry 260 are those write cycles that cause data to be written to and stored into non-volatile memory 214 of non-volatile memory device 210. In such an embodiment, all other types of write cycles may be allowed. It will be understood that in other embodiments write protection circuitry 260 may be additionally or alternatively be configured to detect other specific types of write cycles for disallowance, or that write protection circuitry 260 may be alternatively configured to detect all types of write cycles for disallowance. In this manner, selected types of write cycles may be detected and disallowed while allowing other types of write cycles to proceed.

As shown in FIG. 2, an optional write protection control signal 272 may be provided to write protection circuitry 260 of the embodiment of FIG. 2 to selectably enable and disable write access to non-volatile memory device 210. Such a write protection control signal may be provided from a source external to write protection circuitry 260 (e.g., hardware switch or command from separate circuitry/controller) or may be provided from circuitry internal or integral to write protection circuitry.

Figure 3:
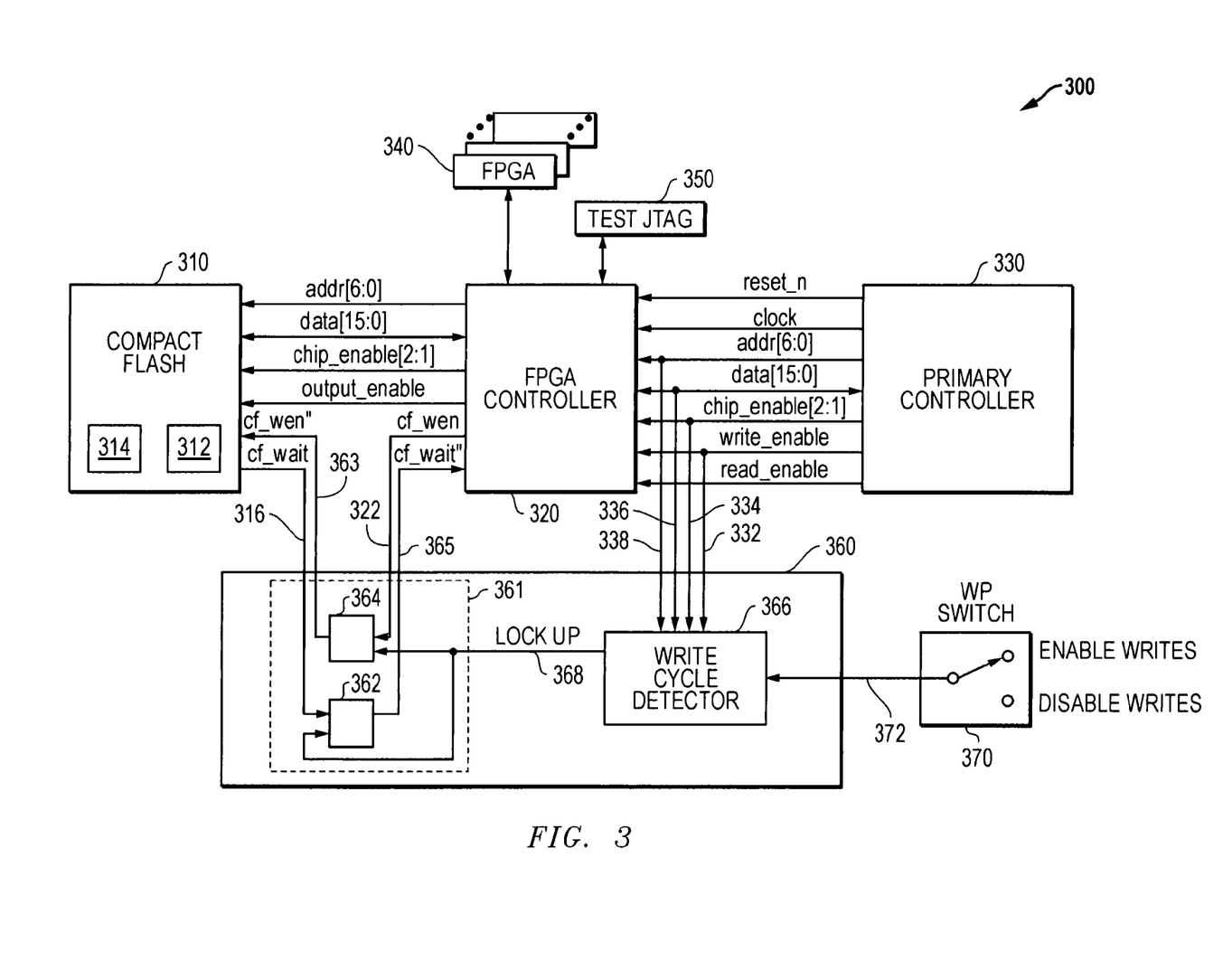
FIG. 3 illustrates a compact flash memory system configured with write protection circuitry according to one embodiment of the disclosed systems and methods.

FIG. 3 illustrates a non-volatile memory system 300 according to one exemplary embodiment of the disclosed systems and methods that employs a Compact flash device 310. As illustrated in FIG. 3, system 300 also includes a secondary controller in the form of FPGA controller 320 that is coupled between primary controller 330 and Compact flash device 310. Also provided is write protection circuitry 360 that is configured external to Compact flash device 310 and that is coupled between primary controller 330 and Compact flash device 310 in the manner shown. External write protection circuitry 360 is configured to monitor Compact flash device write cycles received from primary controller 330 and to control write access to Compact flash device 310. As illustrated, an external write protection control signal 372 may be provided to external write protection circuitry 360 to selectably enable and disable write access to Compact flash device 310.

In the illustrated exemplary embodiment, system 300 is shown configured as a multiple FPGA control system, e.g., with FPGA controller 320 configured as a FPGA controller that manages FPGA configuration data and provides an interface between multiple FPGA devices 340 and multiple configuration sources that may include primary controller 330, Compact flash device 310, and one or more other sources such as Test JTAG interface 350, etc.

Referring to the embodiment of FIG. 3 in more detail, primary controller 330 may be any microprocessor, microcontroller or other processing device suitable for providing data to be written to one or more addresses within Compact flash device 310. In the illustrated exemplary embodiment, primary controller 330 is shown configured to provide clock (clock), address (addr [6:0]), data (data [15:0]), chip enable (chip_enable [2:1]), write enable (write_enable) and read enable (read_enable) signals to FPGA controller 320. Specific examples of suitable processing devices that may be employed as primary controller 330 include, but are not limited to, relatively lower performance processors such as 8051-based architecture microcontrollers, relatively higher performance processors such as MPC7xx or MPC9xx PowerPC processors, etc.

In the illustrated embodiment, the exemplary bracketed bus notation (i.e., addr [6:0]), data [15:0], chip_enable [2:1]) is provided to illustrate that specific bits of a bus may be monitored by write protection circuitry 360 in a manner as will be described further herein. In this regard, it will be understood that a variety of different bus widths may be employed, and that any portion or bits of a given bus may be selected as a signal for monitoring that is suitable for implementing one or more desired write protection feature/s of the disclosed systems and methods.

FPGA controller 320 may be any microprocessor, microcontroller or other device suitable for receiving data from primary controller 330, and for providing this data to be written to one or more addresses within Compact flash device 310. In the illustrated exemplary embodiment, FPGA controller 320 is shown configured to provide address (addr [6:0]), data (data [15:0]), chip enable (chip_enable [2:1]), and output enable (output_enable) signals to Compact flash device 310. FPGA controller 320 is also shown configured to provide a Compact flash write enable (cf_wen) signal 322 to write protection circuitry 360 and to receive a Compact flash wait (cf_wait") signal 365 from write protection circuitry 360, in a manner which will be described further herein. Specific examples of suitable processing devices that may be employed as FPGA controller 320 include, but are not limited to, FPGA configuration controller devices such as System ACE Controller Device available from Xilinx, Inc. of San Jose, Calif., etc.

Still referring to FIG. 3, Compact flash device 310 may include an internal or on-card controller 312 coupled to non-volatile memory 314, and may be, for example, any type of CompactFlash or CompactFlash II device that is suitable for receiving data from FPGA controller 320 and writing the received data to non-volatile memory 314. In this regard, suitable Compact flash devices include those devices complying with the Personal Computer Memory Card International Association (PCMCIA) ATA interface specification, allowing Compact flash device 310 to be coupled to FPGA controller 320 and write protection circuitry 360 using, for example, a CompactFlash socket or a standard Type II PC Card slot with an adapter.

In the illustrated embodiment, Compact flash device 310 is shown configured to receive address (addr [6:0]), data (data [15:0]), chip enable (chip_enable [2:1]), and output enable (output_enable) signals from FPGA controller 320. As further illustrated in FIG. 3, Compact flash device 310 is configured to receive a compact flash interface write enable (cf_wen") signal 363 from write protection circuitry 360 and to provide a compact flash interface wait (cf_wait) signal 316 to write protection circuitry 360, in a manner which will be described further herein. Specific examples of suitable Compact flash devices that may be employed as Compact flash device 310 include, but are not limited to, FPGA configuration memory devices such as ACE Flash memory device available from Xilinx, Inc. of San Jose, Calif., CompactFlash from SanDisk Corporation of Sunnyvale, Calif., etc. In one exemplary embodiment where system 300 is configured as a multiple FPGA control system, Compact flash device 310 may be a FPGA configuration memory device that functions as storage for configuration data and other system data.

In the exemplary embodiment of FIG. 3, external write protection circuitry 360 includes write cycle detector 366 that is coupled to monitor one or more device access signals (e.g., addr [6:0], data [15:0], chip_enable [2:1], and write_enable signals in the illustrated embodiment) provided by primary controller 330 to FPGA controller 320, as illustrated by respective monitor signals 338, 336, 334 and 332. In this regard, write cycle detector 366 may be configured to detect specific programming write cycles, so that such specific write cycles may be disallowed by write protection circuitry 360 while other types of write cycles are allowed, in a manner as described below. Write protection circuitry 360 may be implemented using any circuit configuration suitable for performing the write cycle detection and blocking tasks described herein including, but not limited to, programmable logic device ("PLD"), Programmable Read-Only Memory device ("PROM"), etc.

In the exemplary embodiment of FIG. 3, the address of the command register of non-volatile memory device 310 is monitored by write cycle detector 366 using the addr [6:0] signal, and write commands are monitored by write cycle detector 366 using the data [15:0] signal. Validation of the write command is monitored by write cycle detector 366 using the chip_enable [2:1], and write_enable signals. However, it will be understood that in other embodiments any one or more signal/s provided by a primary controller may be selected for monitoring that are suitable for implementing one or more desired write protection feature/s of the disclosed systems and methods. For example, in one alternate embodiment only address and chip enable signals may be monitored. In another possible embodiment, only a write enable signal may be monitored, e.g., where it is desired to disable all write cycles.

Still referring to the exemplary embodiment of FIG. 3, write detector 366 may be configured to disallow a given write cycle by providing a lock up signal 368 to write blocking circuit 361 of write protection circuitry 360, which operates to disallow the given write cycle in response to the lock up signal 368. In this regard, write blocking circuit 361 may be any circuit configuration suitable for receiving lock up signal 368 and in response thereto either blocking one or more signals between FPGA controller 320 and Compact flash device 310 that are required to enable a write cycle. For example, in the illustrated exemplary embodiment, write blocking circuit 361 includes a switching mechanism in the form of gate circuit 364 that is coupled to receive a compact flash interface write enable signal corresponding to a given write cycle from FPGA controller 320 as signal 322, although any other form of suitable switching mechanism may be employed.

Gate circuit 364 may be of any gate logic configuration suitable for the given signal environment, e.g., "OR" gate, etc. In one exemplary embodiment employing an active low write enable signal and active high lock up signal, gate circuit 364 of write blocking circuit 361 may be configured to selectably allow the given write cycle by providing an active low compact flash interface write enable signal for the given write cycle as signal 363 to Compact flash device 310 in the absence of an active high lock up signal 368 from write cycle detector 366, i.e., when lock up signal 368 is low (inactive). However, in the presence of an active high lock up signal 368 from write cycle detector 366, gate circuit 364 may be configured to withhold the compact flash interface write enable signal 363 from Compact flash device 310, i.e., by providing signal 363 as high (inactive). It will be understood that gate circuit 364 of FIG. 3 is exemplary only, and that any other logic configuration/s may be employed that is suitable for performing as a switching mechanism.

As illustrated, write blocking circuit 361 may also be configured to selectably block one or more additional signals between compact flash device 310 and FPGA controller 320 other than the compact flash interface write enable signal corresponding to a given write cycle. For example, write blocking circuit 361 may be configured to selectively block wait signals provided by compact flash device 310 in order to prevent secondary controller 310 from being placed on hold by compact flash device 310 during those times when write cycle operations are blocked. In this regard, write block circuit 361 of the exemplary embodiment of FIG. 3 is shown including a switching mechanism in the form of gate circuit 362 that is coupled to receive a compact flash interface wait signal 316 from Compact flash device 310, although any other form of suitable switching mechanism may be employed. In a manner similar to gate circuit 364, gate circuit 362 of write blocking circuit 361 may be configured to selectably provide an active low compact flash interface wait signal received from compact flash device 310 as an active low signal 365 to FPGA controller 320 in the absence of lock up signal 368 from write cycle detector 366, i.e., when lock up signal 368 is low (inactive). However, in the presence of active high lock up signal 368 from write cycle detector 366, gate circuit 362 may be configured to withhold the compact flash interface wait signal 365 from FPGA controller 320 to prevent FPGA controller 320 from being placed on hold during the write blocking mode of write protection circuitry 360 i.e., by providing signal 365 as high (inactive). It will be understood that gate circuit 362 of FIG. 3 is exemplary only, and that any other logic configuration/s may be employed that is suitable for performing as a switching mechanism.

In one exemplary embodiment, the specific type of write cycles that may be searched for by write cycle detector 366 for disallowance by external write protection circuitry 360 are those write cycles that cause data to be written to and stored into non-volatile memory 314 of Compact Flash device 310. In such an embodiment, all other types of write cycles (e.g., such as those write cycles used to control registers within. Compact flash device 310) may be allowed. It will be understood that in other embodiments write cycle detector 366 may be additionally or alternatively configured to detect other specific types of write cycles for disallowance, or that write cycle detector 366 may be alternatively configured to detect all types of write cycles for disallowance. In this manner, selected types of write cycles may be detected and disallowed while allowing other types of write cycles to proceed.

As previously described, an external write protection control signal 372 may be provided to write protection circuitry 360 of the embodiment of FIG. 3 to selectably enable and disable write access to Compact flash device 310. Such an external write protection control signal 372 may be provided by any suitable source or combination of sources, etc. In the illustrated exemplary embodiment of FIG. 3, a hardware write protect switch 370 is shown provided to selectably provide external write protection control signal 372 to write detector 366, i.e., to selectably enable and disable generation of lock up signal 368 by write detector 366 so as to selectable enable and disable write access to Compact flash device 310. To enhance security, hardware switch 370 (or hardware jumper) may be configured to be lockable and/or inaccessible (e.g., positioned behind a panel or cover) to unauthorized users. However, it will be understood that an external write protection control signal may be employed to selectably control write access to a compact flash device using any other suitable methodology and/or configuration, e.g., by disabling switching mechanism/s such as gate circuits 362 and 364, by interrupting signals (e.g., 332, 334, 336 and 338) received from primary controller 330, etc. It will be understood that external hardware switch 370 (or hardware jumper) may be a part of external write protection circuitry 260, or may be configured external thereto.

Figure 4:
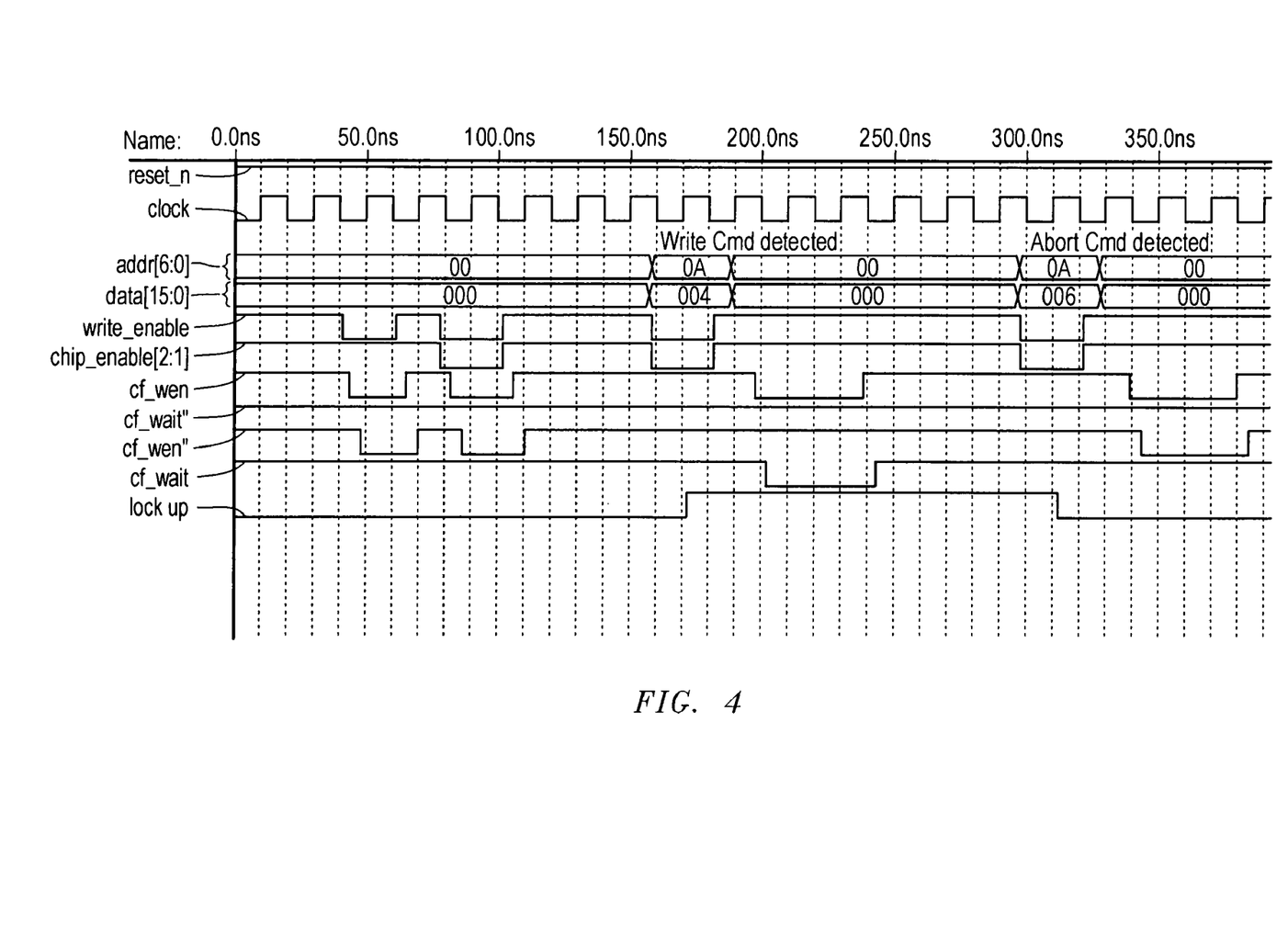
FIG. 4 shows a timing diagram according to one embodiment the disclosed systems and methods.

FIG. 4 is a timing diagram that illustrates operation of the exemplary write protection circuitry 360 of FIG. 3 when it is enabled for write protection mode by external signal 372. The timing diagram of FIG. 4 includes each of address (addr [6:0]), data (data [15:0]), write enable (write_enable) and chip enable (chip_enable [2:1]) signals from primary controller 330 that are monitored as respective signals 338, 336, 334 and 332 by write cycle detector 366 in order to detect programming write cycles that attempt to cause data to be written to and stored into non-volatile memory 314 of Compact Flash device 310. The timing diagram of FIG. 4 also includes lock up signal 368 (lock up) sent by write cycle detector 366 in response to detection of such an attempted write cycle.

As illustrated in FIG. 4, a command for a programming write cycle to non-volatile memory 314 of Compact flash device 310 is detected at approximately 158 nanoseconds where a indicative pattern of address (addr [6:0]), data (data [15:0]), write enable (write_enable) and chip enable (chip_enable [2:1]) signals are sent by primary controller 330 to secondary controller 320. In this regard, the address of the command register of non-volatile memory device 310 is detected by the addr [6:0] signal on the address bus, a write command to the command register of non-volatile memory device 310 is indicated by command "004" that is detected on data [15:0] signal of the data bus. Validation of the write cycle is detected by write-enable and chip_enable [2:1] signals.

In response to this detected write cycle command, write cycle detector 366 provides lock up signal 368 (lock up) to write blocking circuit 361 of write protection circuitry 360 at approximately 172 nanoseconds, which operates to disallow the given write cycle by blocking communication of a Compact flash write enable signal to Compact flash device 310. This is illustrated in FIG. 4 at approximately 197 nanoseconds where Compact flash write enable signal 322 (cf_wen) is provided by secondary controller 320 to write blocking circuit 361, but no corresponding Compact flash write enable signal 363 (cf_wen") is provided to Compact flash device 310 by write blocking circuit 361. During this time write blocking circuit 361 also receives compact flash interface wait (cf_wait) signal 316 from Compact flash device 310 at approximately 202 nanoseconds, but write blocking circuit 361 provides no corresponding compact flash interface wait (cf_wait") signal 365 to secondary controller 320.

Write cycle detector 366 may be configured to continue to provide lock up signal 368 to write blocking circuit 361 of write protection circuitry 360 until the occurrence of one or more events. Examples of such events include, but are not limited to, system reset, system power cycling, or a write cycle abort command issued by primary controller 330 to secondary controller 320. In this regard, primary controller 330 may be configured to provide a write cycle abort command following a programming write cycle to allow secondary controller 320 to proceed to the next operation. At the same time, write cycle detector 366 may discontinue providing lock up signal 368 to write blocking circuit 361 when such an abort command is detected.

As shown in FIG. 4, write cycle detector 366 continues to provide lock up signal 368 (lock up) to write blocking circuit 361 until a write cycle abort command from primary controller 330 is detected for the previous write at approximately 298 nanoseconds, i.e., as indicated by each of address (addr [6:0]), data (command "006" on data [15:0]), write enable (write_enable) and chip enable (chip_enable [2:1]) signals sent by primary controller 330 in the manner shown. In response to the abort command, write cycle detector 366 discontinues providing lock up signal 368 (lock up) to write blocking circuit 361 at approximately 312 nanoseconds, thus allowing other types of write cycles to be performed.

As previously described, write cycle detector 366 may be configured to allow operations other than attempted programming write cycles to non-volatile memory 314 of Compact Flash device 310. For example, as illustrated in FIG. 4, write detector 366 only provides lock up signal 368 (lock up) to write blocking circuit 361 upon receipt of specific patterns of address (addr [6:0]), data (data [15:0]), write enable (write_enable) and chip enable (chip_enable [2:1] signals from primary controller 330, which denote a programming write cycle to non-volatile memory of compact flash device 310. In the absence of lock up signal 368 (lock up), write block circuit 361 provides Compact flash write enable signals 363 (cf_wen") to compact flash device 310 upon receipt of corresponding Compact flash write enable signals 322 (cf_wen) from secondary controller 320, e.g., at approximately 44 nanoseconds to approximately 110 nanoseconds and at approximately 339 nanoseconds to 385 seconds in FIG. 4.

Figure 5:
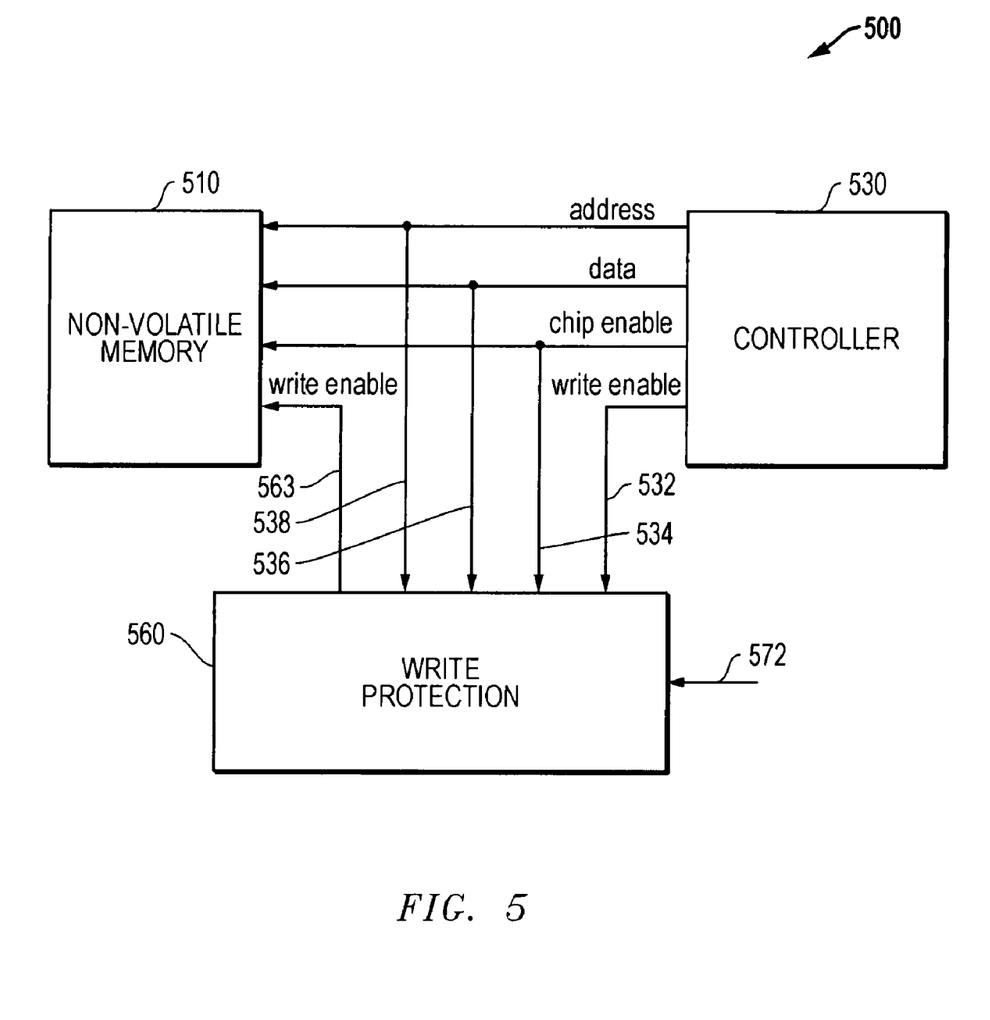
FIG. 5 illustrates a non-volatile memory system according to one embodiment of the disclosed systems and methods.

FIG. 5 illustrates a memory system 500 employing configured with a write protection configuration according to another exemplary embodiment of the disclosed systems and methods. As illustrated in FIG. 5, system 500 includes a controller 530 coupled to non-volatile memory device 510. Non-volatile memory device may be any type of suitable non-volatile memory such as is described elsewhere herein.

FIG. 5 shows write protection circuitry 560 that is coupled between controller 530 and non-volatile memory device 510 in the manner shown. As so configured, write protection circuitry 560 is configured to monitor write cycles received from controller 530 and to control write access to non-volatile memory device 510. As illustrated, external write protection control signal 572 may be provided to write protection circuitry 560 to selectably enable and disable write access to non-volatile memory device 510.

Controller 530 may be any microprocessor, microcontroller or other processing device suitable for providing data to be written to one or more addresses within non-volatile memory device 510. In the illustrated exemplary embodiment, controller 530 is shown configured to provide address, data, and chip enable signals to secondary controller 520, although additional signals may also be provided such as described elsewhere herein. Controller 530 is also shown configured to provide a write enable signal 532 to write protection circuitry 560.

In the illustrated embodiment, non-volatile memory device 510 is shown configured to receive address, data and chip enable signals from controller 530. Non-volatile memory device 510 is also configured to receive a write enable signal 563 from write protection circuitry 560.

In the exemplary embodiment of FIG. 5, write protection circuitry 560 may be configured to monitor one or more device access signals (e.g., address, data, chip enable, and write enable signals in the illustrated embodiment) provided by controller 530, as illustrated by respective monitor signals 538, 536, 534 and 532. In this regard, write protection circuitry 560 may be configured to detect and disallow specific types of write cycles (e.g., programming write cycles, etc.) in a manner as previously described for other embodiments. For example, in the illustrated embodiment, write protection circuitry 560 is coupled to receive a write enable signal 532 corresponding to a given write cycle from controller 530, and to allow the given write signal by providing a corresponding write enable signal 563 for the given write cycle, or to disallow the given write signal by withholding the corresponding write enable signal 563 for the given write cycle.

As shown in FIG. 5, a write protection control signal 572 may be provided to write protection circuitry 560 of the embodiment of FIG. 5 to selectably enable and disable write access to non-volatile memory device 510 in manner as described elsewhere herein in relation to other embodiments. Such a write protection control signal may be provided from a source external to write protection circuitry 560 (e.g., hardware switch or command from separate circuitry/controller) or may be provided from circuitry internal or integral to write protection circuitry.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. A non-volatile memory system, comprising:
   a non-volatile memory device;
   a first controller coupled to said non-volatile memory device, said first controller configured to provide data for writing to said non-volatile memory device; and
   write protection circuitry coupled to said first controller and said non-volatile memory device, said write protection circuitry being configured to monitor at least one signal provided by said first controller, and to selectably disable said data from being written to said non-volatile memory device based at least in part on said monitored signal;
   wherein said write protection circuitry is configured external to said non-volatile memory device and said first controller; and
   wherein said write protection circuitry is configured to be selectably disabled in response to a write protection control signal to allow all data provided by said first controller to be written to said non-volatile memory device.

2. The memory system of claim 1, wherein a source of said write protection control signal is external to said non-volatile memory device and said first controller.

3. The memory system of claim 2, wherein said write protection control signal is provided by an external hardware switch.

4. The memory system of claim 1, wherein said non-volatile memory device comprises a removable non-volatile memory device.

5. The memory system of claim 2, further comprising a second controller coupled between said non-volatile memory device and said first controller, said second controller being configured to receive said data from said first controller and to provide said data for writing to said non-volatile memory device, said second controller comprising a field programmable gate array (FPGA) controller configured to be coupled to one or more FPGA devices.

6. A non-volatile memory system, comprising:
   a non-volatile memory device;
   a first controller coupled to said non-volatile memory device, said first controller configured to provide data for writing to said non-volatile memory device;
   write protection circuitry coupled to said first controller and said non-volatile memory device, said write protection circuitry being configured to monitor at least one signal provided by said first controller, and to selectably disable said data from being written to said non-volatile memory device based at least in part on said monitored signal; and
   a second controller coupled between said non-volatile memory device and said first controller, said second controller being configured to receive said data from said first controller and to provide said data for writing to said non-volatile memory device;
   wherein said write protection circuitry is configured external to said non-volatile memory device and said first controller.

7. The memory system of claim 6, wherein said non-volatile memory device comprises a removable non-volatile memory device.

8. The memory system of claim 7, wherein said non-volatile memory device comprises a removable compact flash memory device.

9. The memory system of claim 7, wherein said write protection circuitry is configured to selectably disable said data from being written to said non-volatile memory device from said second controller based at least in part on said monitored signal provided by said first controller.

10. The memory system of claim 9, wherein said write protection circuitry is coupled to said second controller and to said non-volatile memory device.

11. The memory system of claim 10, wherein said write protection circuitry is configured to be selectably disabled to allow all data provided by said first controller to be written to said non-volatile memory device by said second controller.

12. The memory system of claim 11, wherein said write protection circuitry is configured to be selectably disabled in response to a write protection control signal provided to said write protection control circuitry.

13. The memory system of claim 12, wherein a source of said write protection control signal is external to said non-volatile memory device and said first and second controllers.

14. The memory system of claim 13, wherein said write protection control signal is provided by a hardware switch.

15. The memory system of claim 11, wherein said second controller comprises a field programmable gate array (FPGA) controller configured to be coupled to one or more FPGA devices.

16. The memory system of claim 15, wherein said write protection circuitry is configured to detect a programming write cycle to said non-volatile memory device based at least in part on said monitored signal, and to disable said data to be written to said non-volatile memory device during said programming write cycle.

17. A memory system, comprising:
a removable compact flash memory device;
a first controller coupled to said non-volatile memory device;
a second controller coupled between said non-volatile memory device and said first controller; and
write protection circuitry coupled to said first and second controllers;
wherein said write protection circuitry is configured external to said non-volatile memory device and said first and second controllers;
wherein said first controller is configured to provide at least a first address signal, a first data signal, a first chip enable signal and a first write enable signal to said second controller;
wherein said second controller is configured to provide at least a second address signal, a second data signal and a second chip enable signal to said non-volatile memory device;
wherein said second controller is coupled to said write protection circuitry and is further configured to provide a second write enable signal to said write protection circuitry;
wherein said write protection circuitry is configured to monitor at least said first address signal, said first data signal, said first chip enable signal and said first write enable signal;
wherein said write protection circuitry is further configured to provide a third write enable signal to said non-volatile memory device to enable data to be written to said non-volatile memory device; and
wherein said write protection circuitry is further configured to selectably disable said data from being written to said non-volatile memory device by withholding said third write enable signal from said non-volatile memory device based at least in part on said monitored address, data, chip enable and write enable signals provided by said first controller.

18. The memory system of claim 17, wherein said second controller comprises a field programmable gate array (FPGA) controller configured to be coupled to one or more FPGA devices.

19. The memory system of claim 18, wherein said write protection circuitry is configured to detect a programming write cycle to said non-volatile memory device based at least in part on said monitored address, data, chip enable and write enable signals provided by said first controller, and to disable said data to be written to said non-volatile memory device during said programming write cycle by withholding said third write enable signal from said non-volatile memory.

20. The memory system of claim 19, wherein said write protection circuitry is configured to be selectably disabled in response to a write protection control signal provided to said write protection control circuitry; and wherein said write protection circuitry is further configured to provide said third write enable signal to said non-volatile memory device to enable all data to be written to said non-volatile memory device when said write protection circuitry is disabled.

21. The memory system of claim 20, wherein a source of said write protection control signal is external to said non-volatile memory device and said first and second controllers.

22. The memory system of claim 21, wherein said write protection control signal is provided by a hardware switch.

23. The memory system of claim 22, wherein said system is configured to be employed in a secure data center environment, and wherein said hardware switch is configured to be accessible only to a custodian of said data center.

* * * * *